US012608257B2

(12) United States Patent
Moser et al.

(10) Patent No.: US 12,608,257 B2
(45) Date of Patent: Apr. 21, 2026

(54) SCRUBBING OF FAULT-TOLERANT DIGITAL REGISTER STORAGE MEMORY

(71) Applicant: BAE SYSTEMS Information and Electronic Systems Integration Inc., Nashua, NH (US)

(72) Inventors: David D. Moser, Haymarket, VA (US); Daniel L. Stanley, Warrenton, VA (US); Mark R. Shaffer, Culpeper, VA (US); Richard J. Ferguson, Bealeton, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 43 days.

(21) Appl. No.: 18/429,835

(22) Filed: Feb. 1, 2024

(65) Prior Publication Data

US 2025/0252002 A1 Aug. 7, 2025

(51) Int. Cl.
G06F 11/00 (2006.01)
G06F 11/07 (2006.01)

(52) U.S. Cl.
CPC ........ G06F 11/073 (2013.01); G06F 11/0793 (2013.01)

(58) Field of Classification Search
CPC .......................... G06F 11/073; G06F 11/0793
See application file for complete search history.

(56) References Cited

U.S. PATENT DOCUMENTS

| | | | |
|---|---|---|---|
| 7,211,825 B2 | 5/2007 | Shih et al. | |
| 7,797,610 B1 | 9/2010 | Simkins | |
| 7,859,292 B1 * | 12/2010 | Shuler, Jr. .......... | H03K 19/0033 |
| | | | 326/46 |
| 8,775,865 B2 | 7/2014 | Yang | |
| 9,170,879 B2 | 10/2015 | Yang | |
| 9,201,726 B2 | 12/2015 | Morris et al. | |

(Continued)

FOREIGN PATENT DOCUMENTS

EP 3971901 A1 3/2022

OTHER PUBLICATIONS

Wu, et al., "Gigahertz Large-Area-Electronics RF Switch and its Application to Reconfigurable Antennas," 2020 IEEE International Electron Devices Meeting (IEDM), pp. IEDM20-741-IEDM20-744.

(Continued)

*Primary Examiner* — Joshua P Lottich
(74) *Attorney, Agent, or Firm* — Gary McFaline

(57) ABSTRACT

A memory device includes at least three digital storage circuits arranged in parallel, the digital storage circuits each configured to store state data representing a bit of data in a first or second state; a data input configured to receive input data, the input data representing a bit of data in the first or second state; a voter having a voter output, the voter configured to generate output data at the voter output, the output data representing which of the first and second state are in a majority among the state data stored in each of the digital storage circuits; and a multiplexer operatively coupled to the data input, the voter output, and an input of each of the digital storage circuits, the multiplexer configured to output, to each of the digital storage circuits, one of the input data and the output data based on a functional enable signal.

17 Claims, 6 Drawing Sheets

(56)          References Cited

U.S. PATENT DOCUMENTS

| | | | |
|---|---|---|---|
| 9,990,163 B2 | 6/2018 | Cha et al. | |
| 10,365,681 B1 | 7/2019 | Stark | |
| 10,430,274 B2 | 10/2019 | Lee et al. | |
| 11,204,835 B2 | 12/2021 | Lu et al. | |
| 11,429,481 B1 | 8/2022 | Azad et al. | |
| 11,748,194 B2 | 9/2023 | Lu et al. | |
| 11,861,181 B1* | 1/2024 | Moser | G06F 11/141 |
| 11,966,284 B1* | 4/2024 | Lameres | G06F 11/184 |
| 2014/0227969 A1 | 8/2014 | Fratti | |
| 2015/0121132 A1* | 4/2015 | Tian | G06F 11/1612 |
| | | | 714/6.24 |
| 2015/0169400 A1* | 6/2015 | Morris | G06F 11/1008 |
| | | | 714/764 |
| 2016/0246679 A1 | 8/2016 | Kim et al. | |
| 2017/0161143 A1 | 6/2017 | Reed et al. | |
| 2017/0161144 A1 | 6/2017 | Reed et al. | |
| 2018/0314591 A1 | 11/2018 | Reed et al. | |
| 2020/0264803 A1* | 8/2020 | Bronson | G06F 11/0751 |
| 2021/0182383 A1* | 6/2021 | Dervin | G11C 29/16 |
| 2022/0188187 A1 | 6/2022 | Lu et al. | |
| 2023/0259417 A1* | 8/2023 | Matsunami | G06F 11/0763 |
| | | | 714/42 |

OTHER PUBLICATIONS

International Search Report, PCT/25/13177, mailed Apr. 4, 2025, 9 pages.
International Search Report, PCT/US24/59157, mailed Feb. 3, 2025, 9 pages.

* cited by examiner

Wait for no functional enable
502

Wait for counter/ timer to expire
504

Assert Scrub Enable
506

Processing Platform
600

SCRUBBING OF FAULT-TOLERANT DIGITAL REGISTER STORAGE MEMORY

FIELD OF DISCLOSURE

The present disclosure relates to computer memory devices, and more particularly, to scrubbing for fault-tolerant digital register storage memory.

BACKGROUND

Semiconductor-based digital data registers are a type of data storage memory. Devices incorporating data registers, such as those deployed in mission critical applications, can be subject to one or more event upsets or errors in which impinging radiation (e.g., ions, electrons, photons, etc.) changes the state of a data register. In some instances, the upsets can cause data errors that adversely affect operation of the system using the data register. Therefore, non-trivial issues remain with respect to maintaining the integrity of data stored on devices vulnerable to the effects of radiation.

Figure 1:
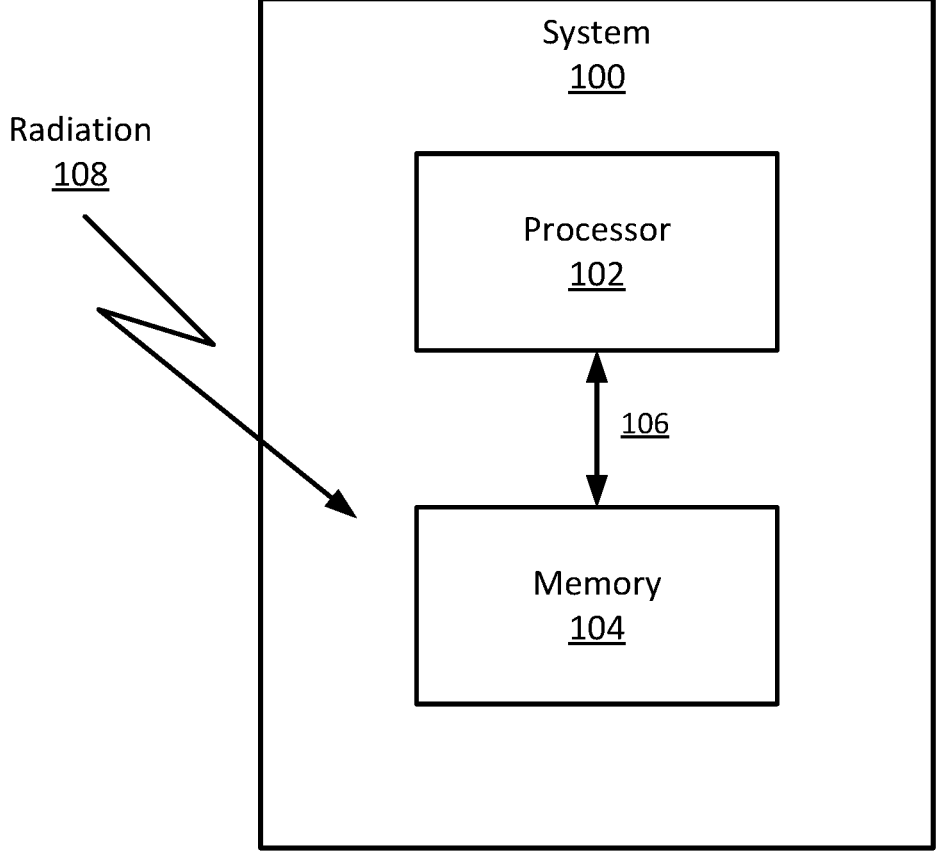
FIG. 1 is a block diagram of a system with scrubbing for fault-tolerant digital register storage memory, in accordance with an example of the present disclosure.

Although the following detailed description refers to illustrative examples, many alternatives, modifications, and variations thereof will be apparent in light of this disclosure.

DETAILED DESCRIPTION

Techniques are provided herein for scrubbing for fault-tolerant digital registers. According to an example, a memory device includes at least three digital storage circuits arranged in parallel, the digital storage circuits each configured to store state data representing a bit of data in a first or second state. A data input is configured to receive input data, where the input data represents a bit of data in the first or second state. The memory device further includes a voter having a voter output, where the voter is configured to generate output data at the voter output. The output data represents which of the first and second state are in a majority among the state data stored in each of the digital storage circuits. The memory device further includes a multiplexer operatively coupled to the data input, the voter output, and an input of each of the digital storage circuits. The multiplexer is configured to output, to each of the digital storage circuits, the input data or the output data based on a functional enable signal. During functional operations, the multiplexer passes the input data to the digital storage circuits. During scrubbing operations, the multiplexer passes (wraps around) the output data back into the digital storage circuits, thereby scrubbing the memory device.

Overview

Triple modular redundancy (TMR), also referred to as triple module redundancy or triple-mode redundancy, is a technique for providing fault tolerance through the use of three identical instances of hardware. A data register is an example of such a hardware instance. Each hardware instance performs the same process in parallel based on a common input. The outputs of the three instances are then evaluated by a voter using majority-voting logic to produce a single output representing the identical outputs of at least two of the three hardware instances. In this manner, the voter effectively masks the hardware instance with a disagreeing output under the presumption that a fault has occurred only in the disagreeing instance and that the two (or more) agreeing instances are each producing a correct output.

Triple modular redundancy can be used for tolerating a single event upset (SEU) in a data register or other data storage device (memory) before two or more such upsets occur. For example, each data register can include three distinct digital storage circuits, such as D flip flops, connected in parallel to a data input line and to the voter. Although the data register as a whole stores a single bit of data, the data register is triply redundant internally such that the same data bit is stored in each of the three digital storage circuits. In this manner, a radiation-induced upset of any one of the three digital storage circuits within the data register will be masked by the voter, which outputs the state of the bit that is stored in at least two of the digital storage circuits. However, if the data in the disagreeing digital storage circuit is not corrected, the system may not be able to tolerate further radiation-induced upsets.

Data scrubbing is an error-correction technique for mitigating the effects of a single event upset. Data scrubbing includes reading data from a storage unit (e.g., a data register), validating the data, correcting any errors in the data, and writing the corrected data back to the same storage unit. As noted above, memory devices, particularly those deployed in high-orbit or other space applications, are subjected to elevated levels of radiation, which can significantly increase data errors. As memory circuits become smaller, a single bit can be flipped from zero to one or from one to zero by a low amount of radiation energy, thereby causing an un-commanded change of the data stored in the device. Additionally, in the context of a TMR data register, if any of the three digital storage units within the register experiences an event upset, subsequent errors, if left uncorrected, can render the memory device non-functional or cause other system errors or failures.

Clock gating techniques are used to conserve power by reducing the frequency at which the fault-tolerant memory device is refreshed. However, some clock gating techniques that are used to conserve power (e.g., by clocking at longer or aperiodic intervals, or only at initial power-up) may increase the likelihood that multiple radiation induced errors will accumulate in the data register if otherwise left undetected and uncorrected. Furthermore, if such errors occur on different redundant hardware instances (e.g., the digital storage circuits) between refreshes, the data register may output an incorrect output because TMR is not tolerant of multiple faults across hardware instances.

To this end, and in accordance with an example of the present disclosure, a scrubbing technique for a memory device is disclosed. A data scrubbing technique is employed for use in conjunction with one or more TMR data registers to further mitigate against data errors caused by one or more event upsets (e.g., a radiation-induced upset). In an example, a scrubbing circuit is configured to scrub a TMR data register by selectively clocking the majority output of the voter back into each of the three digital storage circuits (wrap around). In this manner, if any one of the three digital storage circuits has experienced an event upset (incorrect data) since the last time the TMR register was clocked for new data, the state of the respective digital storage circuit will be scrubbed (refreshed) to the current output of the voter, which is the state of the data input to the register at the most recent functional or data scan (non-scrubbing) clock.

Memory scrubbing is embedded at the memory device level (e.g., a circuit embedded on the memory die), which avoids modification of the Resource Transfer Language (RTL). Scrubbing is performed during non-functional cycles; that is, during cycles where no memory reads or writes are occurring in conjunction with normal (non-scrubbing) operations. Additionally, a rate at which the scrubbing occurs can be adjusted to suit a given application. For example, for storage units that are infrequently written (e.g., where a write operation occurs once every hour, day, month, year, etc.), the scrubbing rate can be set such that it occurs only during certain non-functional cycles rather than during all non-functional cycles.

Some higher forms of redundancy, such as quadruple modular redundancy, operate on a similar principle to TMR and are within the scope of this disclosure. That is, the techniques disclosed herein can be applied to TMR and higher orders of redundancy, as will be appreciated in light of this disclosure. For example, in a quadruply-redundant data register, the voter uses majority-voting logic to produce a single output representing the identical outputs of at least three of the four digital storage circuits. The output of the voter can then be clocked back into the data register during a scrubbing operation to correct any errors. Therefore, references to TMR should not be construed as limiting the scope of this disclosure to triply-redundant systems. Numerous other embodiments and variations will be apparent.

System Architecture

FIG. 1 is a block diagram of a system 100 with scrubbing for fault-tolerant digital register storage memory, in accordance with an example of the present disclosure. The system 100 can be, for example, a system deployed in space, such as on a satellite, or in another environment with high levels of ionizing radiation, such as military or nuclear applications. The system 100 further includes at least one processor 102 operatively coupled to at least one memory 104 via a data communication bus 106. The memory 104 can include, for example, electronic computer memory (e.g., an integrated circuit with metal-oxide-semiconductor (MOS) memory cells) for storing data that can be read and modified by the processor 102. In particular, the memory 104 includes one or more triply redundant data registers and/or one or more data registers with a higher order of redundancy for fault tolerance. For example, at least one of the data registers in the memory 104 is a TMR data register having at least three digital storage circuits, such as three delay (D) flip flops in parallel with each other. The memory 104 can contain any number of TMR (or higher order) data registers.

As noted above, one or more data registers within the memory 104 can be vulnerable to radiation 108. The system 100 is configured to correct data errors within the memory 104, such as SEU errors caused by the radiation 108 impinging on the memory 104, through the use of a scrubbing operation. Memory scrubbing logic is embedded in the memory 104, such as with logic-in-memory, system-on-chip, or a logic circuit that is embedded into the memory die or otherwise tightly integrated with the memory cells. Such embedded logic is configured to perform scrubbing operations during one or more memory or clocking cycles. The periodicity of the scrubbing operations can be based on the rate at which SEUs are expected to occur, but can otherwise be any length of time desired and may occur more frequently than functional clocking of the memory 104.

Data is written to individual data registers within the memory 104 during a memory cycle of the system 100. Such memory cycles occur periodically as defined by a clock (e.g., every 50 nanoseconds) and are scheduled to permit sufficient time for data to written to the memory 104. The clock is used to change or refresh the state of the data registers, which represent data (e.g., bits, words, etc.). The length of each memory cycle depends on factors such as the speed of the processor 102, the speed of the data communication bus between the processor 102 and the memory 104, and the speed of the memory 104. For instance, the time needed to complete one memory cycle can include, at least, an amount of time for the system 100 to access and store data to the memory 104.

Each memory cycle used by the processor 102 to write data is referred to as a functional memory cycle because the memory write operations are performed in service of one or more functions of the system 100. However, not every memory cycle is necessarily utilized for functional writes. For example, some memory cycles may be unused when there are no pending write requests from the processor 102. In another example, one or more of the data registers in the memory 104 may be set at startup of the system 100 and never changed in operation. In such cases, clocking of the data registers in the memory 104 may be gated (suppressed), for example, to reduce power consumption of the system 100. During clock gating, the data registers are not refreshed (written). The longer the interval between clocking of the data registers, the greater the chance that one or more of the data registers will be subjected to an SEU. Therefore, at least some memory cycles are used to perform scrubbing, or refresh, operations on one or more of the data registers, such as described in further detail below.

Figure 2:
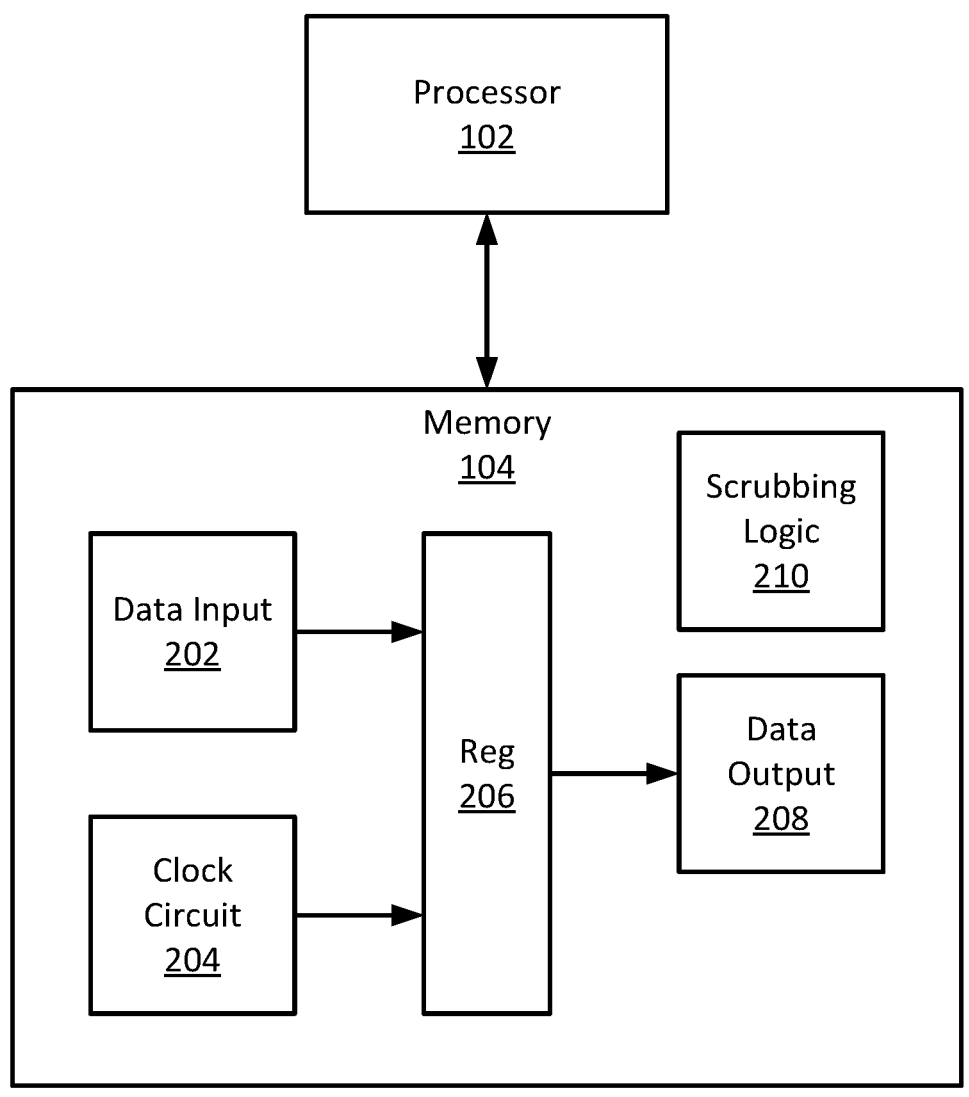
FIG. 2 is a block diagram of a portion of the system of FIG. 1, in accordance with an example of the present disclosure.
Figure 4:
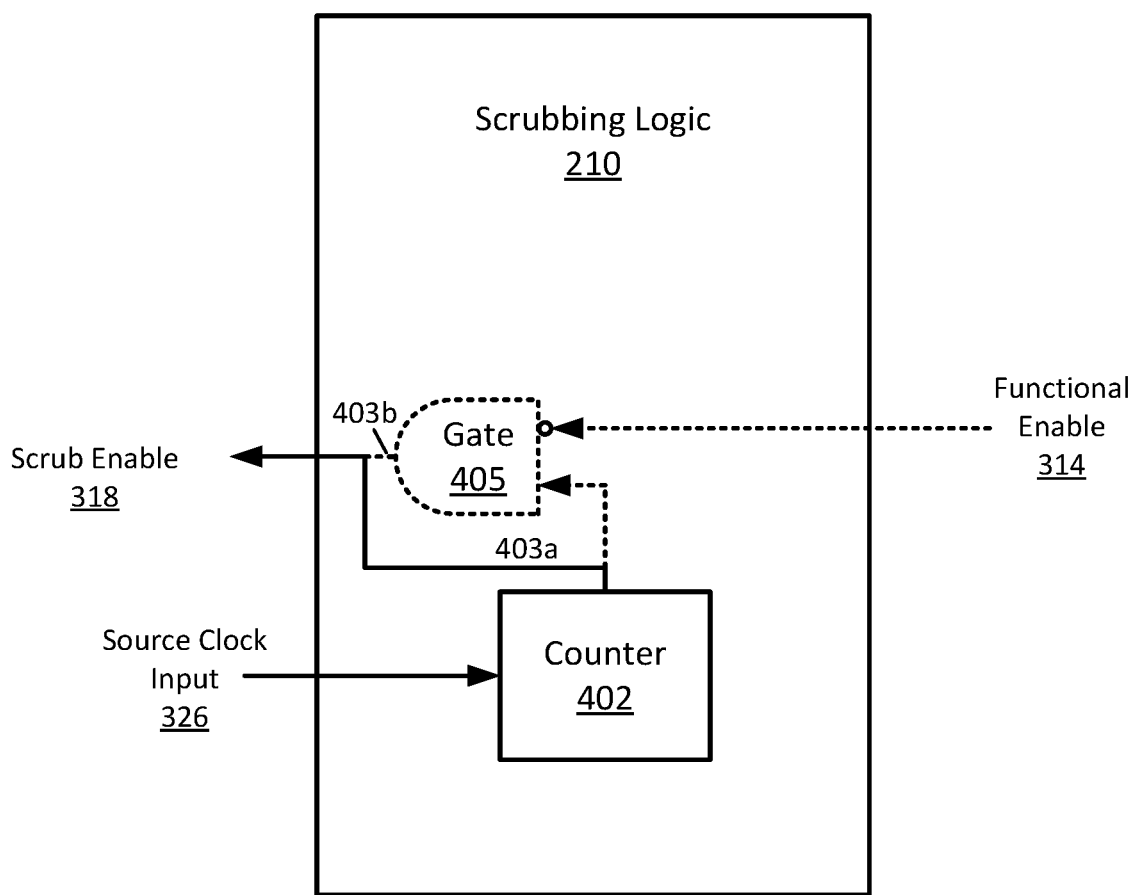
FIG. 4 is a block diagram of a scrubbing logic circuit of the system of FIG. 1, in accordance with an example of the present disclosure.

FIG. 2 is a block diagram of a portion of the system 100 of FIG. 1, in accordance with an example of the present disclosure. The system 100 includes the processor 102 and the memory 104, as shown in FIG. 1. The memory 104 further includes a data input port 202, a clock circuit 204, a fault-tolerant data register circuit 206 (e.g., a TMR data register), a data output port 208, and a scrubbing logic circuit 210. The scrubbing logic circuit 210 is embedded in the memory 104, such as with logic-in-memory, system-on-chip, electrically programmable flash memory, or a logic circuit that is embedded into the memory die or otherwise tightly integrated with the memory cells. An example of the scrubbing logic provided by the scrubbing logic circuit 210 is illustrated in FIG. 4, which may also correspond to the scrubbing process described with respect to FIG. 5.

The data input port 202 is configured to provide data to the data register circuit 206 from or via the processor 102. The clock circuit 204 is configured to gate a clock signal to each of the data registers within the data register circuit 206.

The clock circuit 204 clocks data from the data input port 202 or from the data output port 208 into each of the data registers within the data register circuit 206 based on one or more control signals. The data is clocked from the data input port 202 during functional (or scan) operations, but during scrub operations the data is instead clocked (wrapped around) from the data output port 208 back into the each of the data registers to refresh the state of each of the data registers based on the majority output of the data register circuit 206. Note that a scrub operation does not necessarily inspect the state of the data registers for an error. Rather, the scrub operation is performed periodically to refresh the state of the data registers regardless of whether an error is present or not.

The data register circuit 206 includes a voter between each set of redundant data registers and the data output port 208. As described in further detail below, the voter outputs the majority state of the redundant data registers such that the data output port 208 represents a single state of the data register circuit 206. During a scrubbing operation, the data output port 208 (instead of the data input port 202) is clocked back into the data register circuit 206, thereby refreshing all of the data registers within the data register circuit 206. The data output port 208 is configured to receive data from the data register circuit 206 (via the voter) and to provide the data to the processor 102, the data input port 202, or another component of the system 100 (such as a data communication interface).

Figure 3:
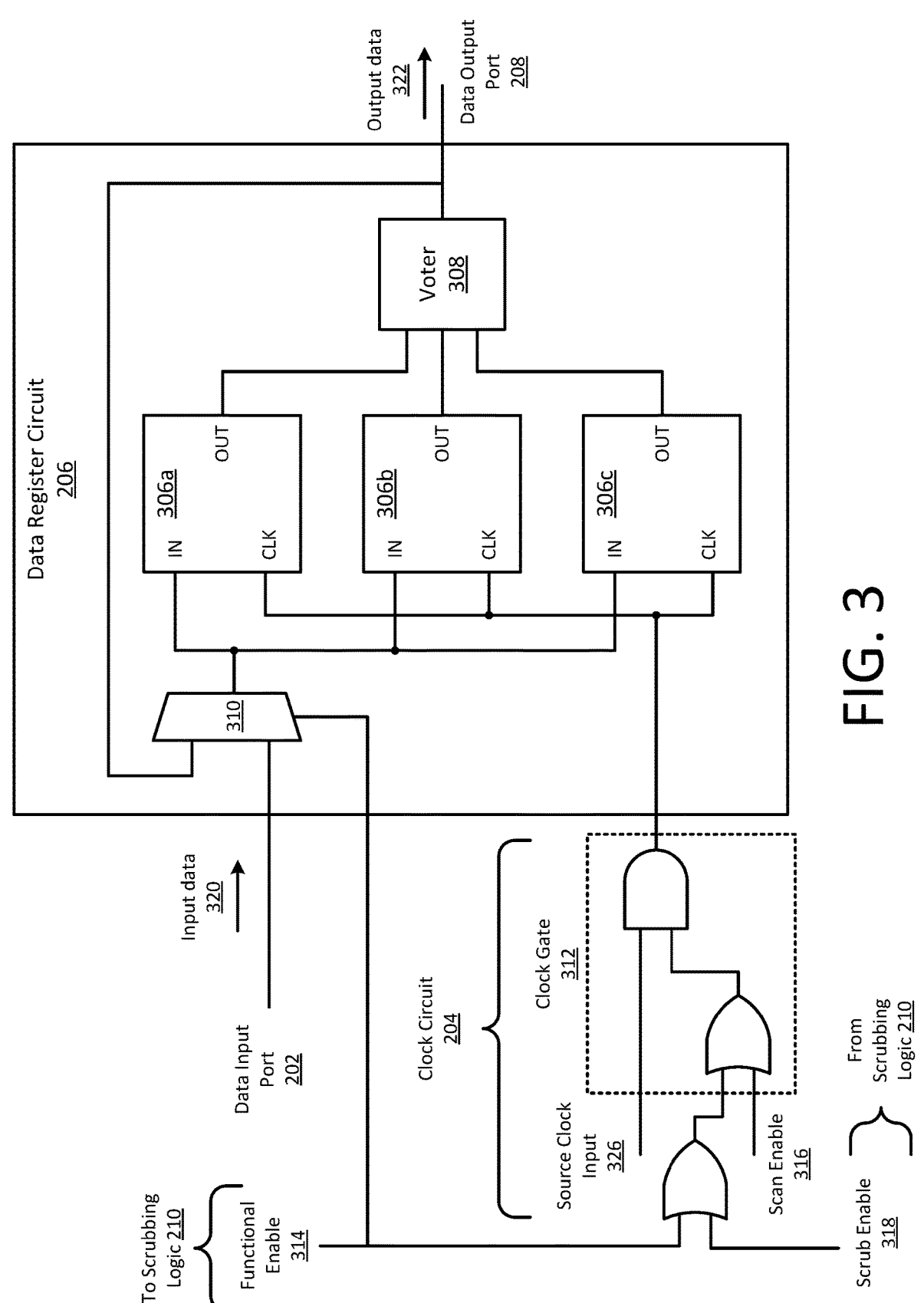
FIG. 3 is a block diagram of a fault-tolerant data register circuit of the system of FIG. 1, in accordance with an example of the present disclosure.

FIG. 3 is a block diagram of the data register circuit 206 of the system 100 of FIG. 1, in accordance with an example of the present disclosure. The data register circuit 206 includes the data input port 202, the data output port 208, a plurality of digital storage circuits 306a, 306b, 306c, each of which can store at least one bit of data, a voter 308, and a multiplexer 310. In some examples, the data register circuit 206 includes three digital storage circuits 306a, 306b, 306c so as to provide triple redundancy; however, it will be understood that the data register circuit 206 can include more than three digital storage circuits without departing from the scope of the disclosure. In some examples, the digital storage circuits 306a, 306b, 306c are implemented as D-type flip flops or another gated latch data storage circuit. The digital storage circuits 306a, 306b, 306c can be volatile or non-volatile, but in either case each of the digital storage circuits 306a, 306b, 306c are potentially susceptible to SEUs that cause an un-commanded change of state in the respective circuit.

The data register circuit 206 is operatively coupled to a clock gate circuit 312 and a functional enable signal 314, which are part of the clock circuit 204. The clock gate circuit 312 is operatively coupled to a source clock input 326, a scan enable signal 316, a scrub enable signal 318, and a clock input of each of the digital storage circuits 306a, 306b, 306c. The clock gate circuit 312 is configured to gate the source clock input 326, which is provided by a clock for the system 100. The clock gate circuit 312 passes the source clock input 326 to the clock input of each of the digital storage circuits 306a, 306b, 306c under the following conditions: the functional enable signal 314 is asserted (e.g., true), the scrub enable signal 318 is asserted (e.g., true), and/or the scan enable signal 316 is asserted (e.g., true). Otherwise, the clock gate circuit 312 inhibits the source clock input 326 from the data register circuit 206.

In operation, when the functional enable signal 314 is asserted (e.g., true), the multiplexer 310 is selected to pass input data 320 from the data input port 202 to a data input of each of the digital storage circuits 306a, 306b, 306c. The input data 320 can have one of two states: logical true (e.g., binary 1) and logical false (e.g., binary 0). Each of the digital storage circuits 306a, 306b, 306c is clocked by the source clock input 326 via the clock gate circuit 312 to store the state of the input data 320 (e.g., true or false).

The voter 308 is configured to receive the output (state) of each of the digital storage circuits 306a, 306b, 306c and to output data 322 representing the majority state of the data stored in each of the digital storage circuits 306a, 306b, 306c. For example, the output data 322 from the voter 308 is logical false if the state of at least two of the digital storage circuits 306a, 306b, 306c is logical false, and the output data 322 from the voter 308 is logical true if the state of at least two of the digital storage circuits 306a, 306b, 306c is logical true. The data register circuit 206 outputs, via the data output port 208, the output data 322 representing the output of the voter 308.

When the functional enable signal 314 is not asserted (e.g., false), the multiplexer 310 is selected to pass the output data from the output of the voter 308 to the input of each of the digital storage circuits 306a, 306b, 306c. As noted above, each of the digital storage circuits 306a, 306b, 306c is clocked by the source clock input 326 via the clock gate circuit 312 to store the state of the input data 320 (e.g., true or false). For example, the clock gate circuit 312 can be enabled via the scrub enable signal 318 while the functional enable signal 314 is not asserted. This effectively refreshes each of the digital storage circuits 306a, 306b, 306c to the state of the output data. Thus, for example, if the output of the voter 308 is true, then each of the digital storage circuits 306a, 306b, 306c is clocked to the true state. Likewise, if the output of the voter 308 is false, then each of the digital storage circuits 306a, 306b, 306c is clocked to the false state. In this manner, if any one of the digital storage circuits 306a, 306b, 306c has been affected by a SEU since it was last clocked, then the state of that circuit is refreshed to match the state of the other two circuits.

The rate at which each of the digital storage circuits 306a, 306b, 306c is clocked can be fixed at a periodic interval based on, for example, the rate at which the data register circuit 206 is expected to be affected by an SEU, or at another rate that is appropriate for a given application (e.g., once per hour, once per day, once per week, once per month, etc.).

FIG. 4 is a block diagram of the scrubbing logic circuit 210, in accordance with an example of the present disclosure. The scrubbing logic circuit 210 generates the scrub enable signal 318. In some examples, the scrubbing logic circuit 210 includes a counter 402, which is incremented by the source clock input 326, that asserts the scrub enable signal 318 each time the counter expires, as shown at 403a. In some other examples, the scrubbing logic 210 further includes gate 405 (which in this case is an AND-gate) which receives as inputs both the output of counter 402 and the functional enable signal, and similarly asserts the scrub enable signal 318 each time the counter expires but only while the functional enable signal 314 is not asserted, as shown at 403b. Other logic gates and/or drivers may be included, such as inverters to place the input signals of the gate 405 (functional enables signal 314 and counter 402 output) in the state needed for AND-logic to work properly. For example, if the counter output is a continuous logic low when the count has expired, an inverter can be used to translate that logic low to a logic high at the input of gate 405; likewise, if functional enable signal 314 is low when not asserted, an inverter can be used to translate that logic low to a logic high at the input of gate 405. Such a configuration may help avoid performing an otherwise timely scrubbing operation during a functional memory cycle. In any such cases, the counter 402 may be a fixed counter that always counts at the same rate, or the counter 402 may be a variable counter or include other conditional logic to generate the scrub enable signal 318 at a variable or adjustable rate. More generally, scrubbing logic 210 may be any programmable circuit embedded in the memory 104 and configured to facilitate the scrubbing process. Further details of the scrubbing process according to some examples are described with respect to FIG. 5.

Scrubbing Process

Figure 5:
FIG. 5 is a flow diagram of a scrubbing process for the system of FIG. 1, in accordance with an example of the present disclosure.
Figure 5:
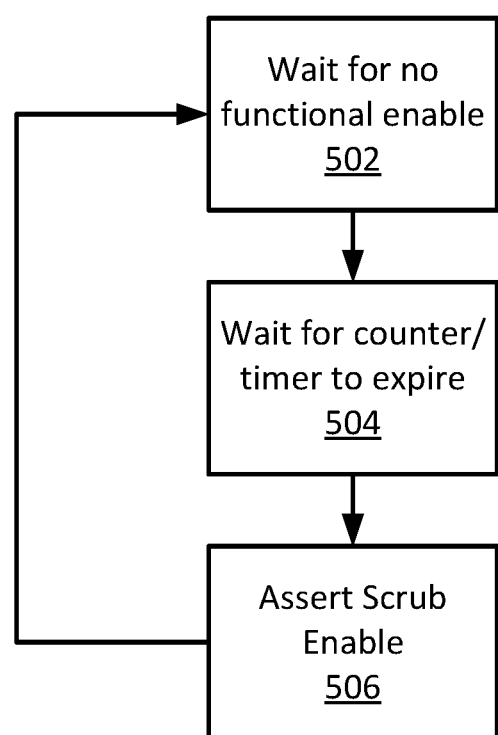

FIG. 5 is a flow diagram of a scrubbing process 500 for the memory 104, in accordance with an example of the present disclosure. The scrubbing process 500 can be executed, for example, using the scrubbing logic circuit 210 of FIG. 4. In this manner, the functional code (e.g., resource transfer language (RTL)) executed by the processor 102 does not need to be modified.

The scrubbing process 500 can be performed on, for example, a memory device comprising a triply redundant digital register circuit configured to store state data representing a bit of data in the first state or a second state, such as described with respect to FIGS. 1-4. The process 500 includes waiting 502 for a functional enable signal to not be asserted to the data register circuit. In this manner, scrubbing is inhibited during a functional event carried out when a functional enable signal is asserted (such as a read or write operation), which would otherwise potentially overwrite newly stored or refreshed data in the memory device. The process 500 further includes waiting 504 for a counter or timer to expire. The counter is incremented (or decremented, as the case may be) by a clock, such as the system clock, and is used to periodically trigger the scrubbing operation. Other timing circuits can be used instead of or in addition to a clocked counter such that the scrubbing operation can be triggered at certain intervals. The method 500 further includes asserting 506, responsive to the counter being expired (or at other timed intervals), a scrub enable signal to the triply redundant digital register circuit. As discussed above, the scrub enable signal enables the clock signal to pass through to the digital register circuit for refreshing the stored data with the output of the digital register circuit (e.g., the output of the voter).

In some examples, the triply redundant digital register circuit comprises at least three digital storage circuits arranged in parallel, the at least three digital storage circuits each configured to the store state data; and a multiplexer configured to select, based on a functional enable signal, one of a data input port and a data output port to pass into the triply redundant data register circuit. During scrubbing operations, the multiplexer passes (wraps around) the output data back into the digital storage circuits, thereby scrubbing the memory device. In some examples, the triply redundant digital register circuit further comprises a voter configured to generate output data at the data output port, the output data representing which of the first state and the second state are in a majority among the state data stored in each of the at least three digital storage circuits. In some examples, the triply redundant digital register circuit comprises at least one D flip flop. As noted above, the techniques described herein can be applied to a digital register circuit having higher orders of redundancy, including quadruple redundancy.

Example System

Figure 6:
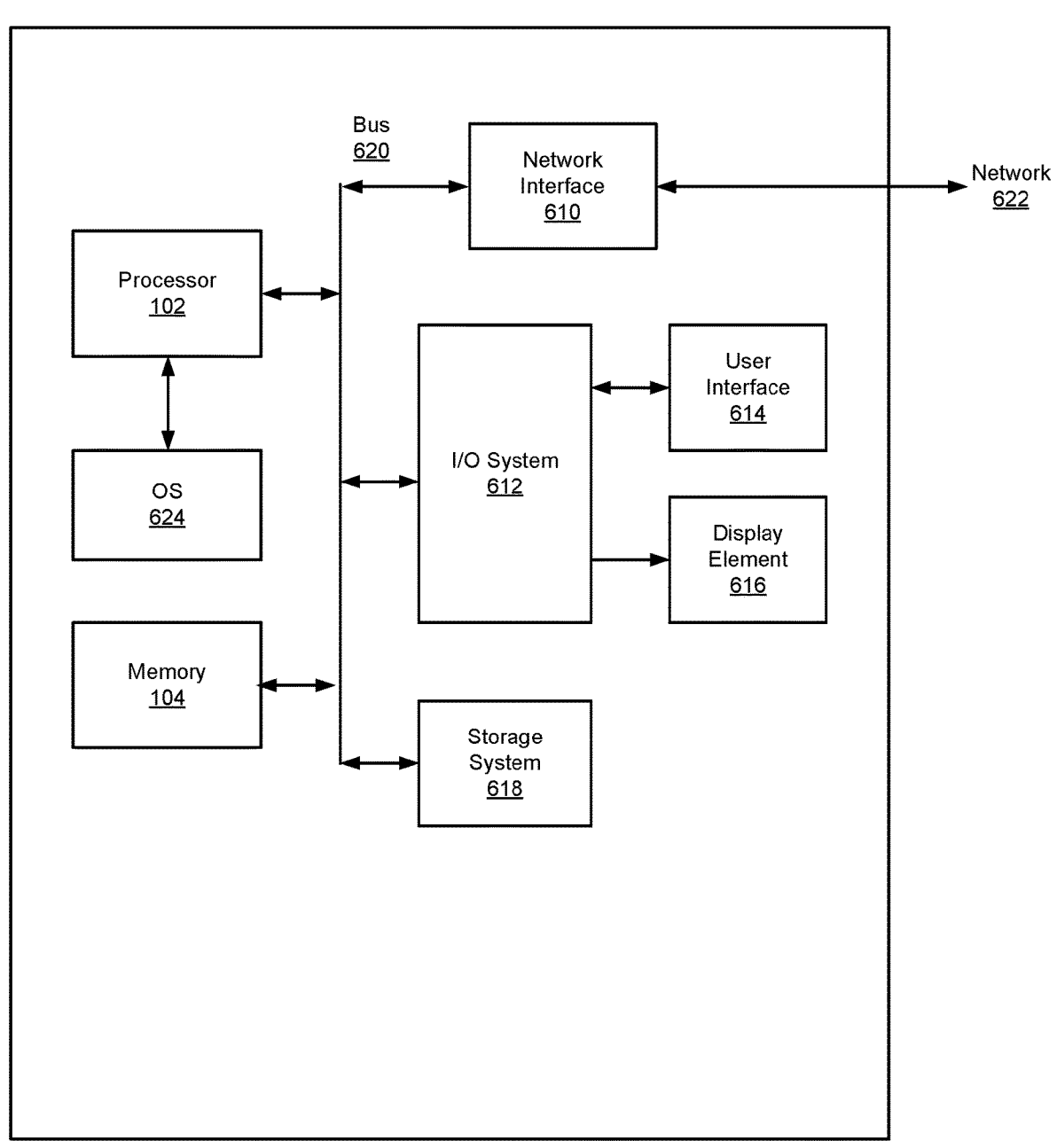
FIG. 6 is a block diagram of a processing platform configured to provide a system with scrubbing for fault-tolerant digital register storage memory, in accordance with an example of the present disclosure.

FIG. 6 is a block diagram of a processing platform 600 configured to provide a system with RAM scrubbing, in accordance with an example of the present disclosure. In some examples, the platform 600, or portions thereof, can be hosted on, or otherwise be incorporated into the electronic systems of a space-based or aerospace platform, including data communications systems, radar systems, computing systems, or embedded systems of any kind, where radiation can cause SEUs, although other applications (including terrestrial applications) will be apparent. The disclosed techniques can also be used to improve memory reliability in other platforms including data communication devices, personal computers, workstations, laptop computers, tablets, touchpads, portable computers, handheld computers, cellular telephones, smartphones, or messaging devices.

In an example, the platform 600 includes any combination of the processor 102, the memory 104, a network interface 610, an input/output (I/O) system 612, a user interface 614, a display element 616, and a storage system 618. For example, the platform includes the system 100 of FIG. 1, including the memory 104 with the scrubbing logic circuit 210 of FIG. 2. A bus and/or interconnect 620 is provided to allow for communication between the various components listed above and/or other components of the platform 600. The platform 600 can be coupled to a network 622 through the network interface 610 to allow for communications with other computing devices, platforms, devices to be controlled, and/or other resources. Other componentry and functionality not reflected in FIG. 6 will be apparent in light of this disclosure, and it will be appreciated that other examples are not limited to any particular hardware configuration.

The processor 102 can be any suitable processor, and can include one or more coprocessors or controllers, such as an audio processor, a graphics processing unit, or hardware accelerator, to assist in the execution of mission software and/or any control and processing operations associated with the platform 600. In some examples, the processor 102 is implemented as one or more processor cores. The processor core or cores can include any type of processor, such as, for example, a micro-processor, an embedded processor, a digital signal processor (DSP), a graphics processor (GPU), a network processor, a field programmable gate array (FPGA), or other computing or electronic device. The processor 102 can have multithreaded cores such that the processor 102 includes more than one hardware thread context or logical processor per core. In some examples, the processor 102 can be implemented as a complex instruction set computer (CISC) or a reduced instruction set computer (RISC) processor.

The memory 104 can be implemented using any suitable type of digital storage including, for example, a random-access memory (RAM). A random-access memory is any memory having storage locations, or cells, which can be read from and written to in any order. For example, the memory 104 can be implemented as a volatile memory device such as a RAM, dynamic RAM (DRAM), or static RAM (SRAM) device. The storage system 618 can be implemented as a non-volatile storage device such as a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

The processor 102 can be configured to execute an Operating System (OS) 624, which can, for example, include any suitable operating system, such as Google Android (Google Inc., Mountain View, CA), Microsoft Windows (Microsoft Corp., Redmond, WA), macOS (Apple Inc., Cupertino, CA), Linux, or a real-time operating system (RTOS).

The network interface circuit 610 can be any network chip or chipset that provides wired and/or wireless connection between other components of the platform 600 and/or the network 622, thereby enabling the platform 600 to communicate with other local and/or remote computing systems, and/or other resources. Wired communication can include, for example, Ethernet. Wireless communication can include cellular communications including LTE (Long Term Evolution) and 5G, Wireless Fidelity (Wi-Fi), Bluetooth, and/or Near Field Communication (NFC). Wireless networks can include, for example, wireless local area networks, wireless personal area networks, wireless metropolitan area networks, cellular networks, and satellite networks.

The I/O system 612 can be configured to interface between various I/O devices and other components of platform 600. I/O devices can include, for example, the user interface 614 and the display element 616. The user interface 614 can include input/output devices such as a touchpad, keyboard, and mouse, etc., for example, to allow the user to interact with the platform 600 or components of the platform 600. The display element 616 can, for example, be configured to display information to a user. The I/O system 612 can include a graphics component configured render graphics on the display element 616. The graphics component can include, for example, a graphics processing unit or a visual processing unit. An analog or digital interface can be used to communicatively couple graphics subsystem and the display element. For example, the interface can include a high definition multimedia interface (HDMI), DisplayPort, wireless HDMI, and/or any other suitable interface using wireless high definition compliant techniques. In some examples, the graphics subsystem can be integrated into the processor 102 or another component (e.g., a graphics chipset) of the platform 600.

It will be appreciated that in some examples, the various components of the platform 600 can be combined or integrated in a system-on-a-chip (SoC) architecture. In some examples, the components can be hardware components, firmware components, software components or any suitable combination of hardware, firmware or software.

In some examples, the platform 600 can be implemented as a wireless system, a wired system, or a combination of both. When implemented as a wireless system, the platform 600 can include components and interfaces suitable for communicating over a wireless shared media, such as one or more antennae, transmitters, receivers, transceivers, amplifiers, filters, control logic, and so forth. An example of wireless shared media can include portions of a wireless spectrum, such as the radio frequency spectrum and so forth. When implemented as a wired system, the platform 600 can include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media can include a wire, cable metal leads, printed circuit board (PCB), backplane, switch fabric, semiconductor material, twisted pair wire, coaxial cable, fiber optics, and so forth.

Various examples of the present disclosure can be implemented using hardware elements, software elements, or a combination of both. Examples of hardware elements can include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software can include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements can vary in accordance with any number of factors, such as desired computational rate, power level, heat tolerances, processing cycle budget, input data rates, output data rates, memory resources, data bus speeds, and other design or performance constraints.

Some embodiments can be described using the expression "coupled" and "connected" along with their derivatives. These terms are not intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

Some examples disclosed herein can be implemented in various forms of hardware, software, firmware, and/or special purpose processors. For example, in one example, at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one example, the system can be hosted on a given website and implemented, for example, using JavaScript or another suitable browser-based technology. For instance, in some examples, the system 100 can leverage processing resources provided by a remote computer system accessible via the network 622. The computer software applications disclosed herein can include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other examples are not limited to any particular hardware or software configuration. Thus, in some examples, the platform 600 can include additional, fewer, or alternative subcomponents as those described above.

The non-transitory computer readable medium can include any suitable medium for storing digital information, such as a hard drive, a server, a flash memory, and/or random-access memory (RAM), or a combination of memories. In some examples, the components and/or modules disclosed herein can be implemented with hardware, including gate level logic such as a field-programmable gate array (FPGA), or alternatively, a purpose-built semiconductor such as an application-specific integrated circuit (ASIC). Still other examples can be implemented with a microcontroller having a number of input/output ports for receiving and outputting data, and a number of embedded routines for carrying out the various functionalities disclosed herein. It will be apparent that any suitable combination of hardware, software, and firmware can be used, and that other examples are not limited to any particular system architecture.

Some examples can be implemented, for example, using a machine readable medium or article that stores a set of instructions that, when executed by a machine, causes the machine to perform a method, process, and/or operations in accordance with the examples described herein. Such a machine can include, for example, any suitable processing platform, computing platform, computing device, processing device, computing system, processing system, computer, process, or the like, and can be implemented using any suitable combination of hardware and/or software. The machine readable medium or article can include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions can include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it will be appreciated that terms such as "processing," "computing," "calculating," and "determining" refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system.

The terms "circuit" or "circuitry" can include, for example, hardwired circuitry, programmable circuitry, such as computer processors comprising one or more individual instruction processing cores, state machine circuitry, and/or firmware that stores instructions executed by programmable circuitry. The circuitry can include a processor and/or controller configured to execute one or more instructions to perform one or more operations described herein. The instructions can be implemented as, for example, an application, software, firmware, etc., configured to cause the circuit or circuitry to perform any of the operations or functions described herein. Software can be implemented as a software package, code, instructions, instruction sets and/ or data recorded on a computer-readable storage device. Software can be implemented to include any number of processes, and processes, in turn, can be implemented to include any number of threads, etc., in a hierarchical fashion. Firmware can be implemented as code, instructions or instruction sets and/or data that are hard-coded (e.g., non-volatile) in memory devices. The circuit or circuitry can be implemented as part of a larger system, for example, an integrated circuit (IC), an application-specific integrated circuit (ASIC), a system-on-a-chip (SoC), desktop computers, laptop computers, tablet computers, servers, smartphones, etc. Other examples can be implemented as software executed by a programmable control device. In such cases, the terms "circuit" or "circuitry" are intended to include a combination of software and hardware such as a programmable control device or a processor capable of executing the software. As described herein, various examples can be implemented using hardware elements, software elements, or any combination thereof. Examples of hardware elements can include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, and/or chip sets.

Further Example Examples

The following examples pertain to further examples, from which numerous permutations and configurations will be apparent.

Example 1 provides a memory device comprising at least three digital storage circuits arranged in parallel, the at least three digital storage circuits each configured to store state data representing a bit of data in a first state or a second state; a data input configured to receive input data, the input data representing a bit of data in the first state or the second state; a voter having a voter output, the voter configured to generate output data at the voter output, the output data representing which of the first state and the second state are in a majority among the state data stored in each of the at least three digital storage circuits; and a multiplexer operatively coupled to the data input, the voter output, and an input of each of the at least three digital storage circuits, the multiplexer configured to output, to each of the at least three digital storage circuits, one of the input data and the output data based on a functional enable signal, thereby scrubbing the at least three digital storage circuits.

Example 2 includes the subject matter of Example 1, wherein the at least three digital storage circuits include a D flip flop.

Example 3 includes the subject matter of any one of Examples 1 and 2, further comprising a clock gate circuit operatively coupled to a source clock input and a clock input of each of the at least three digital storage circuits, the clock gate circuit configured to gate the clock input to each of the at least three digital storage circuits based at least in part on the functional enable signal and a scrub enable signal.

Example 4 includes the subject matter of Example 3, wherein the clock gate circuit is further configured to pass the clock input while the functional enable signal is asserted or while the scrub enable signal is asserted.

Example 5 includes the subject matter of Example 4, further comprising a scrubbing logic circuit configured to assert the scrub enable signal while the functional enable signal is not asserted.

Example 6 includes the subject matter of Example 5, wherein the scrubbing logic circuit comprises a counter clocked by the source clock input, and wherein the scrubbing logic circuit is further configured to assert the scrub enable signal while the counter is expired.

Example 7 includes the subject matter of Example 5, wherein the scrubbing logic circuit is further configured to assert the scrub enable signal at a periodic interval.

Example 8 includes the subject matter of Example 3, wherein the clock gate circuit comprises an AND gate and an OR gate, wherein an input to the AND gate is operatively coupled to the source clock input and an output of the OR gate, wherein an output from the AND gate is operatively coupled to the clock input of each of the at least three digital storage circuits, and wherein an input of the OR gate is operatively coupled to at least one of the functional enable signal and the scrub enable signal.

Example 9 provides a memory device comprising a data input port configured to receive input data, the input data representing a bit of data in a first state or the second state; a fault-tolerant digital register circuit configured to store state data representing a bit of data in the first state or a second state; a data output port configured to produce output data, the output data representing the state data stored in the fault-tolerant digital register circuit; and a multiplexer operatively coupled to the data input port and the data output port, the multiplexer configured to select, based on a functional enable signal, one of the data input port and the data output port to pass to the fault-tolerant data register circuit, thereby scrubbing the fault-tolerant digital register circuit.

Example 10 includes the subject matter of Example 9, wherein the fault-tolerant digital register circuit includes a voter configured to generate output data at the data output port, the output data representing which of the first state and the second state are in a majority among the state data stored in the fault-tolerant digital register circuit.

Example 11 includes the subject matter of Example 10, further comprising a clock gate circuit operatively coupled to a source clock input and a clock input of the fault-tolerant digital register circuit, the clock gate circuit configured to gate the clock input to the fault-tolerant digital register circuit based at least in part on a scrub enable signal.

Example 12 includes the subject matter of Example 11, wherein the clock gate circuit is further configured to pass the clock input while the scrub enable signal is asserted.

Example 13 includes the subject matter of Example 12, further comprising a scrubbing logic circuit configured to assert the scrub enable signal while the functional enable signal is not asserted.

Example 14 includes the subject matter of Example 13, wherein the scrubbing logic circuit comprises a counter clocked by the source clock input, and wherein the scrubbing logic circuit is further configured to assert the scrub enable signal while the counter is expired.

Example 15 includes the subject matter of Example 13, wherein the scrubbing logic circuit is further configured to assert the scrub enable signal at a periodic interval.

Example 16 provides a method of scrubbing a memory device, the memory device comprising a triply redundant digital register circuit configured to store state data representing a bit of data in the first state or a second state, the method comprising waiting for a functional enable signal to not be asserted; waiting for a counter or a timer to expire, the counter or the timer incremented by a clock; and asserting, responsive to the counter or the timer being expired, a scrub enable signal to the triply redundant digital register circuit, thereby scrubbing the triply redundant digital register circuit.

Example 17 includes the subject matter of Example 16, further comprising asserting the scrub enable signal at a periodic interval.

Example 18 includes the subject matter of any one of Examples 16 and 17, wherein the triply redundant digital register circuit comprises at least three digital storage circuits arranged in parallel, the at least three digital storage circuits each configured to the store state data; and a multiplexer configured to select, based on a functional enable signal, one of a data input port and a data output port to pass into the triply redundant data register circuit.

Example 19 includes the subject matter of Example 18, wherein the triply redundant digital register circuit further comprises a voter configured to generate output data at the data output port, the output data representing which of the first state and the second state are in a majority among the state data stored in each of the at least three digital storage circuits.

Example 20 includes the subject matter of any one of Examples 16-19, wherein the triply redundant digital register circuit comprises at least one D flip flop.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A memory device comprising:

at least three digital storage circuits arranged in parallel, the at least three digital storage circuits each configured to store state data representing a bit of data in a first state or a second state;

a data input configured to receive input data, the input data representing a bit of data in the first state or the second state;

a voter having a voter output, the voter configured to generate output data at the voter output, the output data representing which of the first state and the second state are in a majority among the state data stored in each of the at least three digital storage circuits;

a multiplexer operatively coupled to the data input, the voter output, and an input of each of the at least three digital storage circuits, the multiplexer configured to output, to each of the at least three digital storage circuits, one of the input data and the output data based on a functional enable signal; and a clock gate circuit operatively coupled to a source clock input and a clock input of each of the at least three digital storage circuits, the clock gate circuit configured to gate the clock input to each of the at least three digital storage circuits based at least in part on the functional enable signal and a scrub enable signal.

2. The memory device of claim 1, wherein the at least three digital storage circuits include a D flip flop.

3. The memory device of claim 1, wherein the clock gate circuit is further configured to pass the clock input while the functional enable signal is asserted or while the scrub enable signal is asserted.

4. The memory device of claim 3, further comprising a scrubbing logic circuit configured to assert the scrub enable signal while the functional enable signal is not asserted.

5. The memory device of claim 4, wherein the scrubbing logic circuit comprises a counter clocked by the source clock input, and wherein the scrubbing logic circuit is further configured to assert the scrub enable signal while the counter is expired.

6. The memory device of claim 4, wherein the scrubbing logic circuit is further configured to assert the scrub enable signal at a periodic interval.

7. The memory device of claim 1, wherein the clock gate circuit comprises an AND gate and an OR gate, wherein an input to the AND gate is operatively coupled to the source clock input and an output of the OR gate, wherein an output from the AND gate is operatively coupled to the clock input of each of the at least three digital storage circuits, and wherein an input of the OR gate is operatively coupled to at least one of the functional enable signal and the scrub enable signal.

8. A memory device comprising:

a data input port configured to receive input data, the input data representing a bit of data in a first state or a second state;

a fault-tolerant digital register circuit configured to store state data representing a bit of data in the first state or the second state;

a data output port configured to produce output data, the output data representing the state data stored in the fault-tolerant digital register circuit;

a multiplexer operatively coupled to the data input port and the data output port, the multiplexer configured to select, based on a functional enable signal, one of the data input port and the data output port to pass to the fault-tolerant data register circuit; and a clock gate circuit operatively coupled to a source clock input and a clock input of the fault-tolerant digital register circuit, the clock gate circuit configured to gate the clock input to the fault-tolerant digital register circuit based at least in part on a scrub enable signal;

wherein the fault-tolerant digital register circuit includes a voter configured to generate output data at the data output port, the output data representing which of the first state and the second state are in a majority among the state data stored in the fault-tolerant digital register circuit.

9. The memory device of claim 8, wherein the clock gate circuit is further configured to pass the clock input while the scrub enable signal is asserted.

10. The memory device of claim 9, further comprising a scrubbing logic circuit configured to assert the scrub enable signal while the functional enable signal is not asserted.

11. The memory device of claim 10, wherein the scrubbing logic circuit comprises a counter clocked by the source clock input, and wherein the scrubbing logic circuit is further configured to assert the scrub enable signal while the counter is expired.

12. The memory device of claim 10, wherein the scrubbing logic circuit is further configured to assert the scrub enable signal at a periodic interval.

13. A method of scrubbing a memory device, the memory device comprising at least a triply redundant digital register circuit configured to store state data representing a bit of data in a first state or a second state, the method comprising:

waiting for a functional enable signal to not be asserted;

waiting for a counter or a timer to expire, the counter or the timer incremented by a clock; and asserting, responsive to the counter or the timer being expired, a scrub enable signal to the triply redundant digital register circuit, wherein the triply redundant digital register circuit comprises at least three digital storage circuits arranged in parallel, the at least three digital storage circuits each configured to the store state data; and a multiplexer configured to select, based on a functional enable signal, one of a data input port and a data output port to pass into the triply redundant data register circuit.

14. The method of claim 13, further comprising asserting the scrub enable signal at a periodic interval.

15. The method of claim 13, wherein the triply redundant digital register circuit further comprises:

a voter configured to generate output data at the data output port, the output data representing which of the first state and the second state are in a majority among the state data stored in each of the at least three digital storage circuits.

16. The method of claim 13, wherein the triply redundant digital register circuit comprises at least one D flip flop.

17. The method of claim 13, wherein the scrub enable signal enables the clock to pass through to the at least three digital storage circuits.

* * * * *